United States Patent Office 2,864,315
Patented Dec. 16, 1958

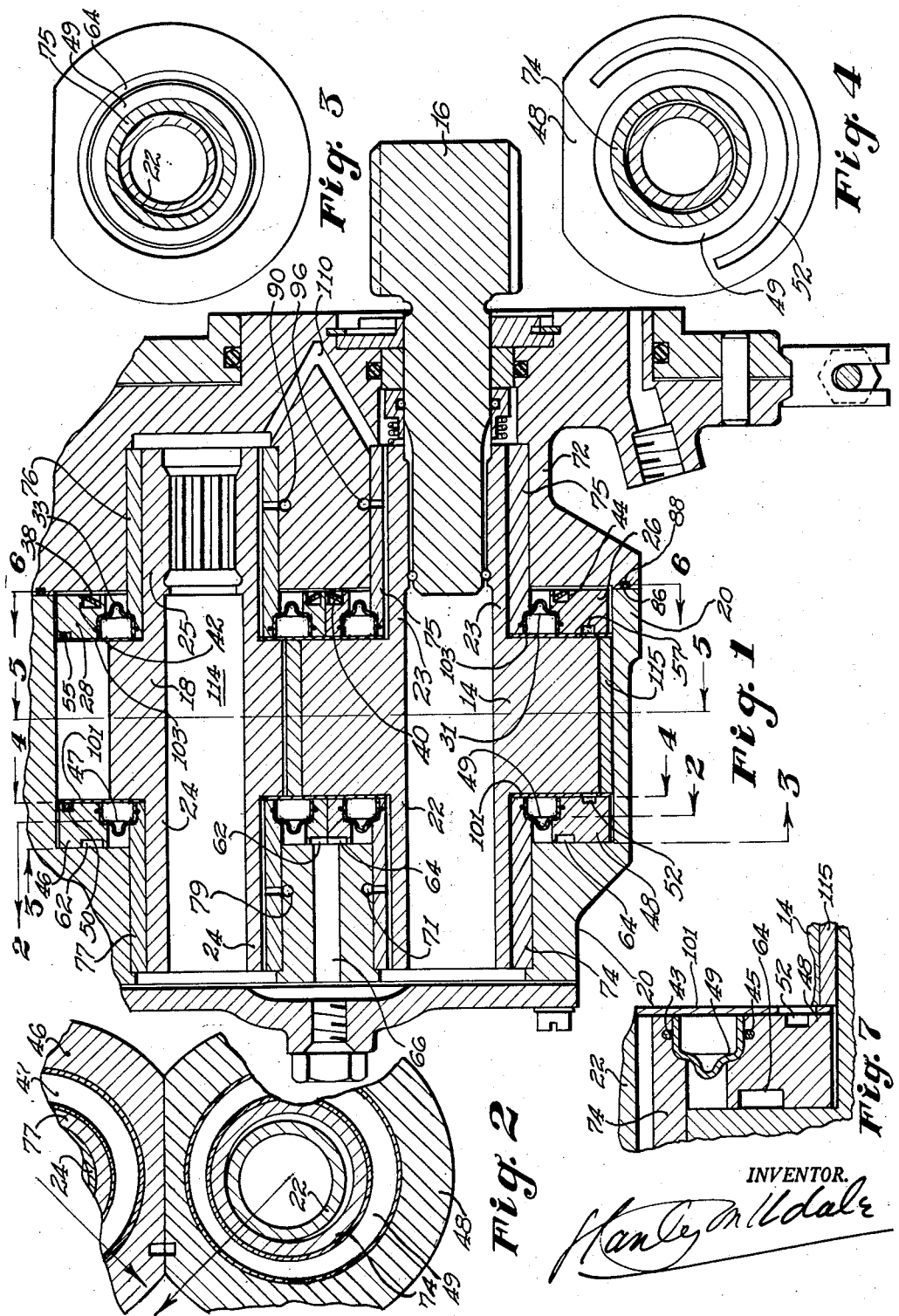

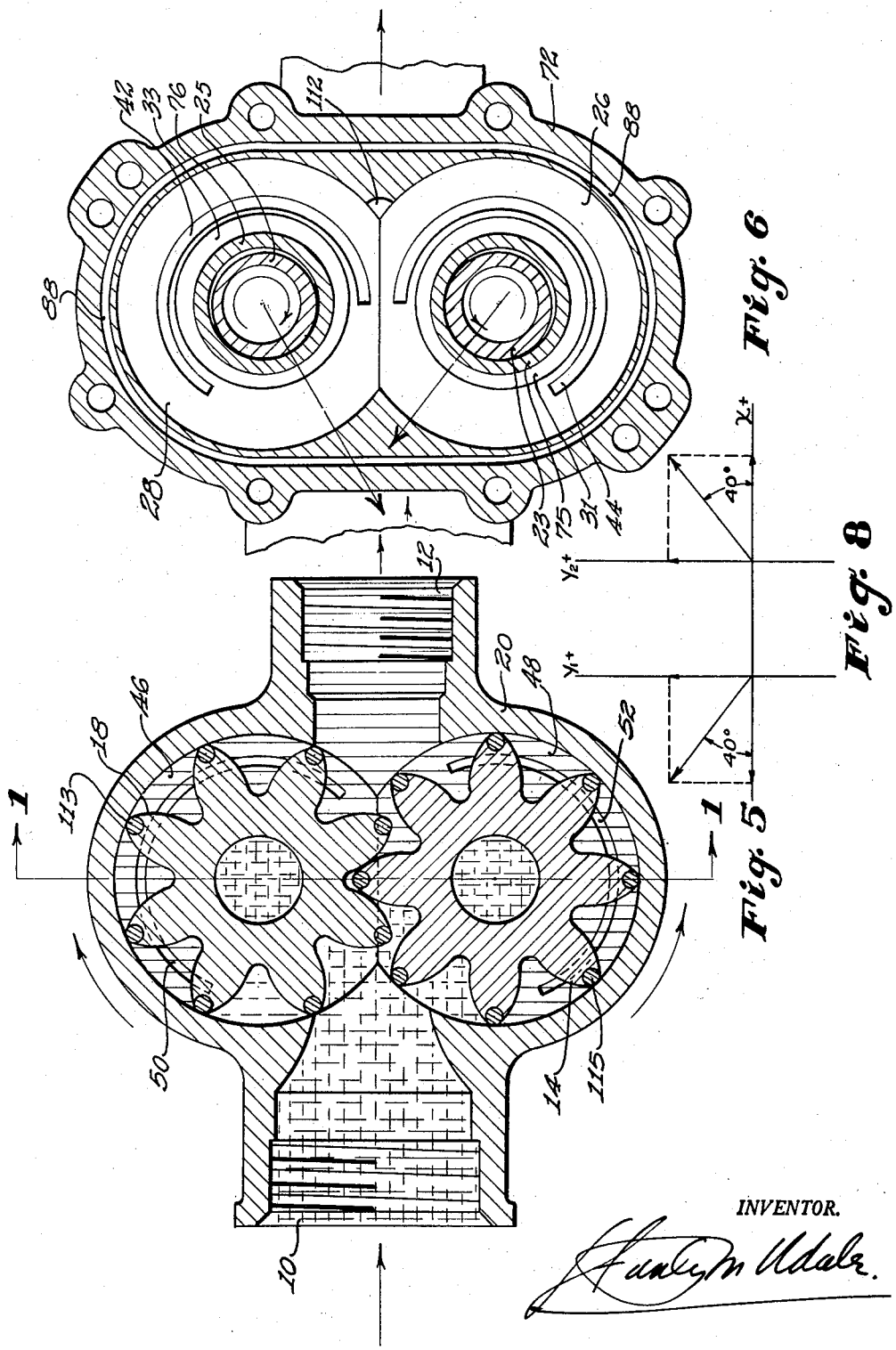

2,864,315

LIQUID PUMP

Stanley M. Udale, Detroit, Mich., assignor to Holley Carburetor Company, Detroit, Mich., a corporation of Michigan Application February 11, 1954, Serial No. 409,720

2 Claims. (Cl. 103—126)

The object of this invention is to improve the endurance qualities and performance of high pressure gear fuel pumps embodying axially movable discharge pressure loaded end seal plates sealing the rotating gear end faces. In the usual pump of this type a circular ring area on the non-contact face of a combined L-shaped end seal plate and gear shaft journal bearing is exposed to pump discharge pressure or some modification thereof to provide a force urging the end (flange) seal plate in contact with the rotating gear end face slightly in excess of that force acting from the gear on the contact face of the end seal plate; this effects a positive seal between the end seal plate and the rotating gear end face.

However, with such a construction the forces around the support area where the end seal plate rests on the gear bore are such that at high pressures the end seal plate has a tendency to cock, with consequent increase in the unit load due to the pressure loading force. In the construction shown in this invention, the end seal plates contacting the rotating gear end faces are flexible.

Figure 1 is a cross-sectional plan view taken on plane 1—1 of Figure 5;

Figure 2 is a partial cross-sectional elevation taken on plane 2—2 of Figure 1;

Figure 3 is a partial cross-sectional elevation taken on plane 3—3 of Figure 1, and made at a slightly reduced scale;

Figure 4 is a partial cross-sectional elevation taken on plane 4—4 of Figure 1 and made at a slightly reduced scale;

Figure 5 is a cross-sectional elevation taken on plane 5—5 of Figure 1;

Figure 6 is a cross-sectional elevation taken on plane 6—6 of Figure 1;

Figure 7 is an enlarged detail of the lower left-hand corner of Figure 1.

Fig. 8 is a graph of resultants of forces acting on each of the two gear shafts.

In the drawings:

10 is the low pressure fuel entrance (see Fig. 5).

12 is the high pressure fuel exit. The driving gear 14, with integral support shafts 22 and 23, is driven by the splined shaft 16. 18 is the driven gear also with integral support shafts 24 and 25. 20 is the outboard pump housing provided with two overlapping cylindrical cavities into which fit the two gears 14 and 18 and the end plates 26, 28, 46 and 48. 72 is the inboard pump housing into which the inboard shafts 23 and 25 from the gears 14 and 18 extend. 72 has two shallow overlapping cylindrical cavities of the same diameter as those in outboard pump housing 20 into which the end plates 26 and 28 fit in order to provide means for dowelling the casing 20 to the casing 72. An O seal 86 in groove 88 (Figs. 1 and 6), prevents liquid from escaping between the pump housings 20 and 72 when they are bolted together.

Four journal bearings 74, 75, 76 and 77 are fixed in the outboard and inboard pump housings 20 and 72 to receive the supporting shafts 22, 23, 24 and 25 of the gears. These journals are separated from the four end seal plates 26, 28, 46 and 48 by the annular stampings 47, 49, 31 and 33.

These stampings are brazed to the end plates so that there is a flexible connection between the flange and the bushings. Figure 7 shows exactly how this is done. In Figure 7 the journal bearing 74 snugly fits inside the annular stamping 49 and the end plate 48 engages around the corresponding outside edge of the annular stamping 49. Two silver solder rings are placed in the small grooves 45 and 43. These three end elements 74, 48 and 49 are assembled together and are brazed in a hydrogen brazing furnace. Three other sets of three elements, namely, 77, 47, 46; 76, 33, 28 and 44, 31, 75 are provided.

Outboard and inboard housings 20 and 72 are dowelled together so that the bores receiving journals 74, 75, 76 and 77 may be line bored after which journals 74, 75, 76 and 77 are shrunk or pressed into place with an interference fit of approximately 0.001 inch per inch of journal outside diameter. The journals 74, 75, 76 and 77 are provided with lubrication slots in a conventional manner. Lubricating passages in the housing 20 are indicated by the four openings 71, 79, 96 and 90.

In order to subject the inboard end seal plates 26—28 to high pressure a passage 112 (Fig. 6) is provided in the inboard casing 72. Through this passage high pressure is transmitted to the right hand side of the two inboard end seal plates 26—28 (Fig. 1). Low pressure is transmitted to the left hand side of the two outboard end plates 46—48 through a passage not shown, connecting low pressure entrance 10 with a low pressure passage 66 which communicates with the two grooves 62 and 64 in the two end plates 46 and 48. Low pressure is also transmitted to the inboard journals 75 and 76 through the inclined passage 110 (Fig. 1) which passage is connected to the passage 114 in the middle of driven gear 18.

In Fig. 5 the broken square cross-hatching indicates low inlet pressure. The vertical lines represent the high pressure in the fuel outlet. A study of the distribution of high and low pressures will explain how this pump is sealed.

On the outboard end of the two overlapping cylindrical bores in the outboard housing 20 are the two outboard end seal plates having exactly the same thickness 46 and 48 as each other. A narrow groove 52 in 48 (Fig. 4) is located on the face of end seal plate 48 which may be separated from the gear by a thin flexible metal sheet 101. This sheet is perforated opposite the groove 52. A similar groove 50 is located on the similar face of end seal plate 46. These grooves extend from the pressure side of the pump around to within some whole multiple (usually one) of the angular tooth spacing from the pump inlet to establish definite areas of high and low pressure around the faces of the end seal plates 46 and 48 in contact with the gears as shown in Fig. 5. Similar grooves 57 and 55 in the end seal plates 26 and 28 are provided for similar purposes. The non-gear contact faces of end seal plates 46 and 48 have wider grooves 62 and 64 which are vented to low inlet pressure through passage 66.

Two springs 38 and 40 of Fig. 1 provide the necessary initial end thrust loading when the pump is first assembled. These two springs rest in the two annular grooves 42 and 44 (Figs. 1 and 6) provided to accommodate the two springs 38 and 40 (Fig. 1). These give a slight initial end thrust.

In Figs. 2, 3 and 4 a very slight eccentricity is provided as indicated by the two arrows (Fig. 2) which across each other at right angles and each of which are inclined at 45° to a horizontal line which divides the end plate 48 and the end plate 46. The end plate 48 and the end plate 46 are made slightly eccentric so that they are pressed against the outer wall of the outboard casing 20. This gives them a tendency to seal so that the high pressure will not leak to the low pressure. See Fig. 5. The annular stampings 49, 47, 33 and 31 therefore act to have a double function, (1) to permit the whole pump to distort under high pressure and (2) to seal the high pressure from the low pressure entrance. Both the clearance and the amount of eccentricity are exaggerated.

A thin plate 101 separates the end plate 46 from the gear teeth 18. A thin plate 103 separates the gear teeth 18 from the end plate 28. The same or a plate similar to 103 and 101 separates the gear 114 from the end plates 26 and 28. These plates can be as thick as .005 of an inch and can be as thin as .001 of an inch.

The outside diameter of the nitra-alloy gears 14 and 18 may be 1.9995". The inside diameter of the housing 20 may be 2.0005". Nitra-alloy is a steel alloy containing approximately Al 1%, Cr 1½%, Mo 0.2, etc. etc. and has the property of being nitrided to give a good wearing surface. The outside diameter of the copper lead end seal plates is 1.999". The roller 113 and 115 on the tips of the gear teeth thus contact the cylindrical bores.

The outside diameter of the gear shafts 22, 23, 24, 25 is 0.748" and the inside diameter of the copper lead journals 74, 75, 76 and 75 is 0.750". Fig. 8, X and $Y_1$ are two of three coordinates of Fig. 5. The arrows indicate two resultants at approximately 40° to X forcing the parts 23 and 25 against the housing 20.

Operation

Before the pump is started, the pumping elements are in definite positions. Springs 38 and 40 (Figs. 1 and 7) urge end seal plates 26 and 28 into contact with the inboard end faces of gears 14 and 18. The outboard end faces of gears 14 and 18 are urged into contact with the inboard faces of end seal plates 46 and 48 which urges the non-gear contact or outboard faces of end seal plates 46 and 48 into sealing contact with the outboard vertical faces of the overlapping cylindrical bores in outboard pump housing 20. These measures effect a preliminary seal for fluid leakage from high to low pressure at all points except across the gear tooth tips and their rollers 113 and 115.

Immediately after the pump starts, pressure built up in the exit 12 and the leakage across the gear end face back to entrance 10 is reduced by the end pressure of the inboard seal plates 26 and 28 against the sides of the two gears 14 and 18. This pressure is transmitted against the two outboard seal plates 46 and 48. The left side of outboard end plates 46 and 48 (Fig. 5) is maintained at the low pressure in the fuel entrance 10 as shown by the broken square cross-hatching (Fig. 5) which holds these against the vertical face of outboard housing 20.

The area of the four end plates 26, 28, 46 and 48 are subjected on their inner faces to the high pressure generated by the gear teeth displacing liquid. Four narrow grooves 50, 52, 53 and 55 (Fig. 5) equalize this pressure over the faces of the end plates.

This application is a continuation in part of my copending application, Serial No. 372,329, filed Aug. 4, 1953, now Patent No. 2,787,224, on "Fuel Pump." In this case Serial No. 372,329 and in Patent No. 2,682,836 to William Orr, the steps in this invention are (a) Orr utilizes the entrance low pressure to automatically cause the high pressure to force the tips of the gear teeth into contact with the cylindrical case so as to seal; (b) Serial No. 372,329 provides rollers to reduce wear of the housing as the teeth in the Orr pump cut the aluminum housing; (c) in this case to the total improvements shown in (a) and (b) is added the feature of this application which permits a considerable degree of eccentricity so that there is a spring load shifting the end plates 46 and 48 together on their flat faces as shown in Figure 2. The actual clearances are much less than those shown.

There is an increase in pressure through channels 50 and 52 (Fig. 5) beginning at entrance 10 ending at outlet 12. If each gear is 1" wide, if inlet pressure is 5 pounds per square inch and if outlet pressure is 50 pounds per square inch, then approximately 80 pounds will be the force pushing each of the two gears against the housing 20 so as to make the rollers 113—115 seal the pressure thus created. The force will act at approximately $$\left.\begin{array}{l}40° \text{ to axis } X \\ 50° \text{ to axis } Y_1\end{array}\right\} \text{Fig. 8}$$

so that parts 23 and 25 are pushed in the direction of arrows shown in Fig. 2 to create the clearance shown in Fig. 6.

What I claim as my invention is:

1. In a pump having two intermeshing gears, a cylindrical housing enclosing said gears, having a low pressure entrance and a high pressure exit, four supporting shafts, two for each gear, four bearings inserted in said housing, said bearings projecting into the housing, four end plates engaging the sides of said gears and said cylindrical housing and supported by said bearings, less than circular grooves formed in said end plates on their inner faces and terminating in said exit zone and terminating short of said inlet zone so that more than half the circumference of said gear is subjected to the outlet pressure yieldable means interposed between said bearings and said end plates comprising a U-shaped annular stamping so designed that it is compressed more on one side than the other so that the cylindrical ends of the end plates and the teeth of the gears are both pressed into contact with the cylindrical walls of said housing on the low pressure side of said housing, the clearances between the shafts and the bearings being sufficient to permit the gears to just contact the walls of the housing on the low pressure entrance side.

2. In a pump having a pair of intermeshing gears, a housing for such gears having cylindrical surfaces, an inlet and an outlet, two supporting shafts for each gear and four bearings for said shafts projecting into the walls of said housing; sealing means comprising, four annular resilient stampings of U-shaped cross section, four end plates arranged between the side faces of the gears and the walls of the housing, less than circular grooves formed in said end plates on their inner sides and terminating in said exit zone and terminating short of said inlet zone so that more than half the circumference of said gear is subjected to the outlet pressure, each of said plates being also recessed to receive the outer face of one of the annular stampings, a circular surface in said housing located eccentrically of the centers of said bearings, one of said annular stampings being interposed between each of said eccentric bearings and each of said end plates, said annular stampings being compressed by said cylindrical surfaces and said bearings to a greater extent on one side thereof than on the diametrically opposite side so as to force adjacent end plates together and to force their outer edges into contact with the walls of the housing proximate the inlet of the pump.

References Cited in the file of this patent

UNITED STATES PATENTS

| | | |
|---|---|---|
| 2,624,287 | Ilyin | Jan. 6, 1953 |
| 2,660,958 | Lauck | Dec. 1, 1953 |
| 2,682,836 | Orr, Jr. | July 6, 1954 |
| 2,691,945 | Wichorek | Oct. 19, 1954 |
| 2,706,452 | Hilton | Apr. 19, 1955 |